United States Patent [19]

Fujita et al.

[11] Patent Number: 4,650,007

[45] Date of Patent: Mar. 17, 1987

[54] ROTARY POWER TOOL

[75] Inventors: Masahiro Fujita, Sennan; Yukio Uemura, Yokohama, both of Japan

[73] Assignees: Nissan Motor Co., Ltd., Kanagawa; Maeda Metal Industries, Ltd., Higashinari, both of Japan

[21] Appl. No.: 596,971

[22] Filed: Apr. 5, 1984

[30] Foreign Application Priority Data

Apr. 13, 1983 [JP] Japan ................................ 58-65115

[51] Int. Cl.⁴ ............................................ B23Q 5/04

[52] U.S. Cl. ................................ 173/12; 192/114 R; 192/56 R

[58] Field of Search ............... 173/12, 5; 81/473, 480, 81/474; 192/114 R, 56 R

[56] References Cited

U.S. PATENT DOCUMENTS

| | | | |
|---|---|---|---|
| 3,266,607 | 8/1966 | Frisbie | 192/114 |
| 3,398,611 | 8/1968 | Hahner | 192/114 |
| 4,006,785 | 2/1977 | Roll et al. | 173/12 |
| 4,215,594 | 8/1980 | Workman, Jr. et al. | 173/12 |
| 4,265,320 | 5/1981 | Tanaka et al. | 173/12 |
| 4,458,565 | 7/1984 | Zilly et al. | 173/12 |

*Primary Examiner*—Donald R. Schran
*Assistant Examiner*—James L. Wolfe
*Attorney, Agent, or Firm*—Armstrong, Nikaido, Marmelstein & Kubovcik

[57] ABSTRACT

A rotary power tool wherein an epicyclic train has a planet gear support frame coupled to an output shaft by a one-way clutch and a sun gear coupled to the output shaft by a clutch assembly which comprises a clutch plate, a slide tube, an arresting mechanism and a change lever, the output shaft being operable for tightening first with low-torque high-speed rotation and finally with high-torque low-speed rotation and being prevented from abruptly rotating at a high speed even if the load on the output shaft decreases.

2 Claims, 11 Drawing Figures

FIG.3A
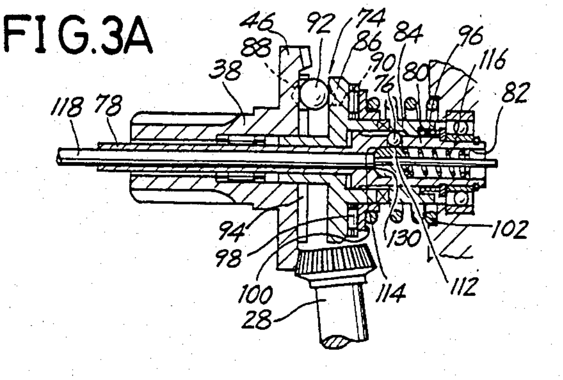
FIG.3B
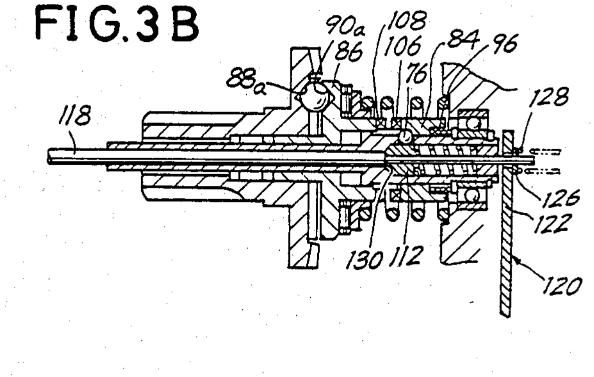
FIG.5
FIG.4
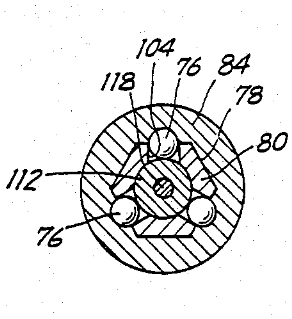
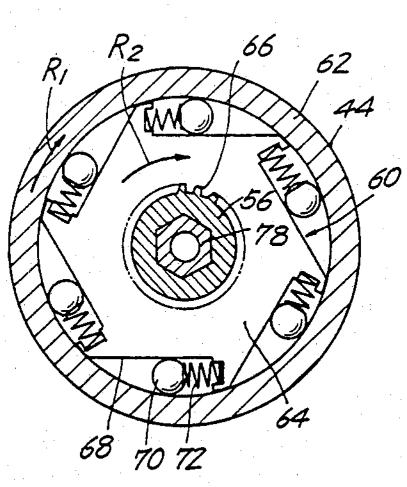

ROTARY POWER TOOL

TECHNICAL FIELD

The present invention relates to a rotary power tool, and more particularly to a device for tightening up a bolt first by high-speed rotation with a low torque and finally by low-speed rotation with a high torque.

BACKGROUND ART

A tightening device of this type has already been proposed which comprises an epicyclic train for giving low-torque high-speed rotation when rotated in its entirety and for delivering high-torque low-speed rotation from a planet gear support frame when the inner gear of the train is brought out of rotation (Published Examined Japanese Patent Application SHO No. 57-48348).

The tightening device includes a drive shaft which serves also as a sun gear and with which the inner gear is engageable by a clutch. The clutch is adapted to automatically disengage when the torque acting on an output shaft exceeds a specified value.

However, when the load on the output shaft decreases during high-torque low-speed rotation, the clutch automatically engages to alternatively bring the output shaft into high-speed rotation again, hence hazardous.

SUMMARY OF THE INVENTION

An object of the present invention is to provide a rotary power tool wherein an output shaft is coupled through a one-way clutch to the planet gear support frame of an epicyclic train and is further coupled to the sun gear by clutch means.

Another object of the present invention is to provide clutch means comprising a clutch plate engageable with a sun gear by being biased by a spring and disengageable from the sun gear when subjected to a high load, a slide tube fitting around a clutch shaft so as to be slidable on and rotatable with the clutch shaft, the slide tube being engageable with the clutch plate by being biased by a spring, the clutch shaft rotatably extending through the center of the sun gear, an arresting mechanism for holding the slide tube in a retracted position when the clutch plate and the slide tube are retracted against the springs by a high load acting on the clutch plate, and a change lever for releasing the slide tube from the arresting mechanism.

Another object of the invention is to provide a rotary power tool having an output shaft which is operable for tightening first with low-torque high-speed rotation and finally with high-torque low-speed rotation and which is prevented from abruptly rotating at a high speed even if the load on the output shaft decreases.

BRIEF DESCRIPTION OF THE DRAWINGS

FIGS. 3A and 3B are views showing the operation of a clutch in sequence;

FIG. 4 is a view in section taken along the line IV—IV in FIG. 1;

FIG. 5 is a view in section taken along the line V—V in FIG. 1;

DETAILED DESCRIPTION OF THE INVENTION

Figures 1, 9:
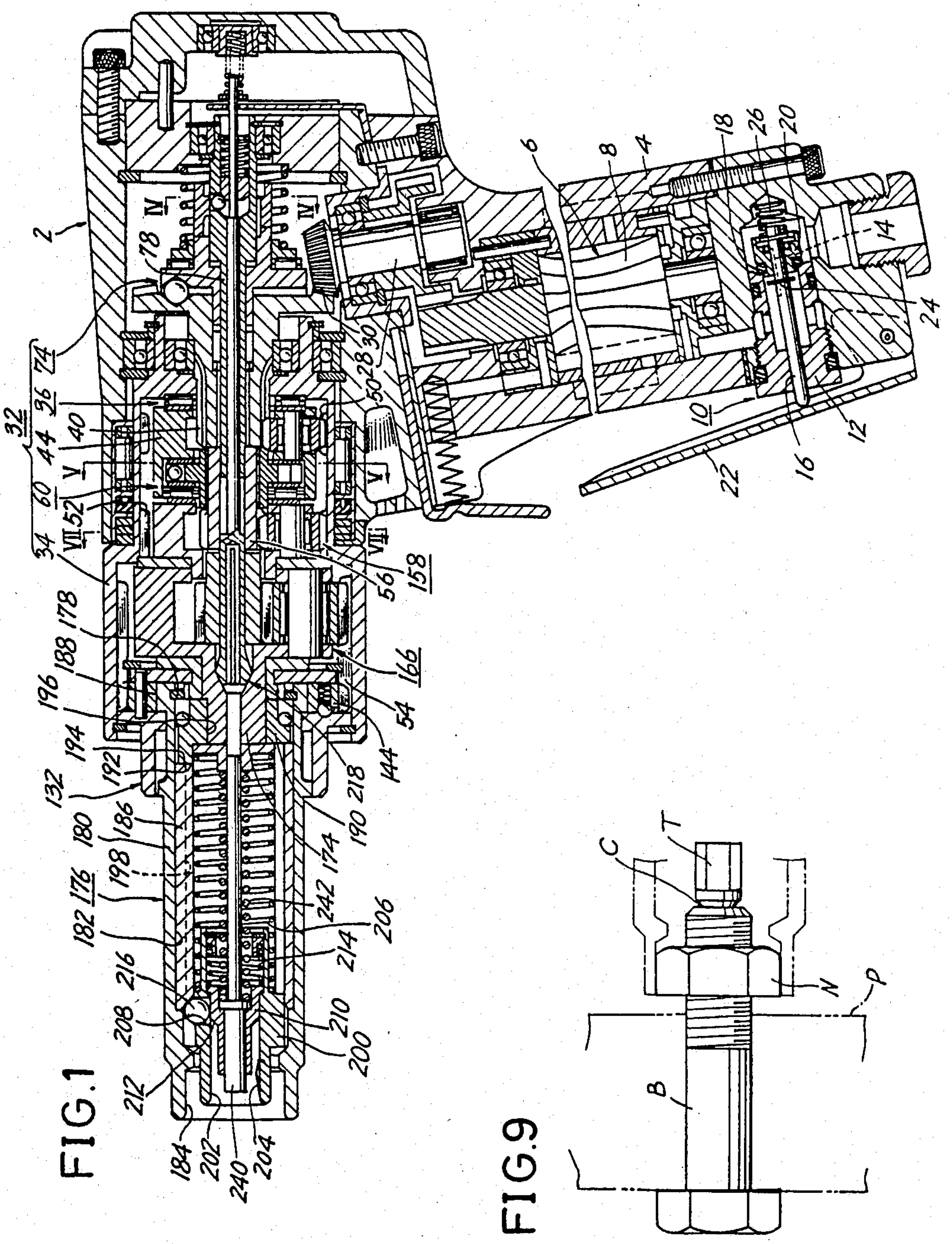
FIG. 1 is a sectional view showing a rotary power tool.
FIG. 9 is a front view showing a bolt and a nut.

The present invention will be described below with reference to the embodiment shown in the drawings.

The tightening device illustrated and embodying the present invention is adapted to tighten up a nut N on a bolt B having a tip T to be snapped off from the forward end of its shank as seen in FIG. 9. The tip is snapped off by applying a fastening or tightening force in excess of a predetermined torque to properly tighten up the bolt and nut with the torque.

The tightening device comprises a housing 2 including a grip portion 4, a drive assembly 6 housed in the grip portion 4, a speed change assembly 32 provided in the housing 2 and partly extending outward from the forward open end of the housing 2, and a socket unit 176 removably connected to the speed change assembly 32 and including an inner socket 200 and an outer socket 180 engageable with the tip T of the bolt B and the nut N, respectively.

The components of the tightening device will be described below.

Drive Assembly

As seen in FIG. 1, the drive assembly 6 is an air motor comprising a rotor 8 rotatably disposed within the grip portion 4. By an air flow rate change valve 10, the speed of rotation of the rotor 8 is changeable in three steps, i.e. zero (stop), low and high speeds.

The flow rate change valve 10 comprises a valve body 12 disposed at the outer end of the grip portion 4, a throttle pin 16 slidably extending through the valve body and having an axial air flow channel 14, a spool 20 slidably fitting around the inner end of the pin 16 and biased against a valve seat 18 on the valve body 12 by a spring, and a throttle lever 22 for moving the throttle pin 16.

When the throttle lever 22 is slightly pulled toward the grip to push the throttle pin 16 inward, the air flow channel 14 in the pin 16 is exposed at opposite sides of the spool 20, permitting air to flow through the channel 14 toward the rotor 8 at a low rate and rotate the rotor 8 at a low speed.

When the throttle lever 22 is further pulled greatly, a snap ring 24 on the throttle pin 16 pushes the spool 20 to release the valve seat 18 of the valve body 12, permitting air to flow toward the rotor 8 at a high rate, whereby the rotor 8 is rotated at a high speed.

When the throttle lever 22 is freed, the spool 20 and the throttle pin 16 are returned to the original position by a spring 26, preventing the flow of air toward the rotor 8 to stop the rotation of the rotor 8. The rotor 8 is coupled to the speed change assembly 32 by a transmission shaft 28.

Speed Change Assembly

The speed change assembly 32 has a tubular case 34 rotatably fitted in the forward end opening of the housing 2. Arranged within the case 34 are a main epicyclic train 36, an output shaft 56 aligned with a sun gear 40 of the train 36, clutch means 74 for coupling the output shaft 56 to the sun gear 40, and a one-way clutch 60 provided between a planet gear support frame 44 and the output shaft 56 for permitting the rotation of the sun gear 40 in preference. When required as in the present embodiment, one or more auxiliary epicyclic trains 158 and 166 are coupled to the output shaft 56 in series therewith.

The planet gears 42, 162, 170 of the epicyclic trains 36, 158, 166 are in mesh with inner gears 50, 52, 54 formed on the inner surface of the tubular case 34.

Figure 2:
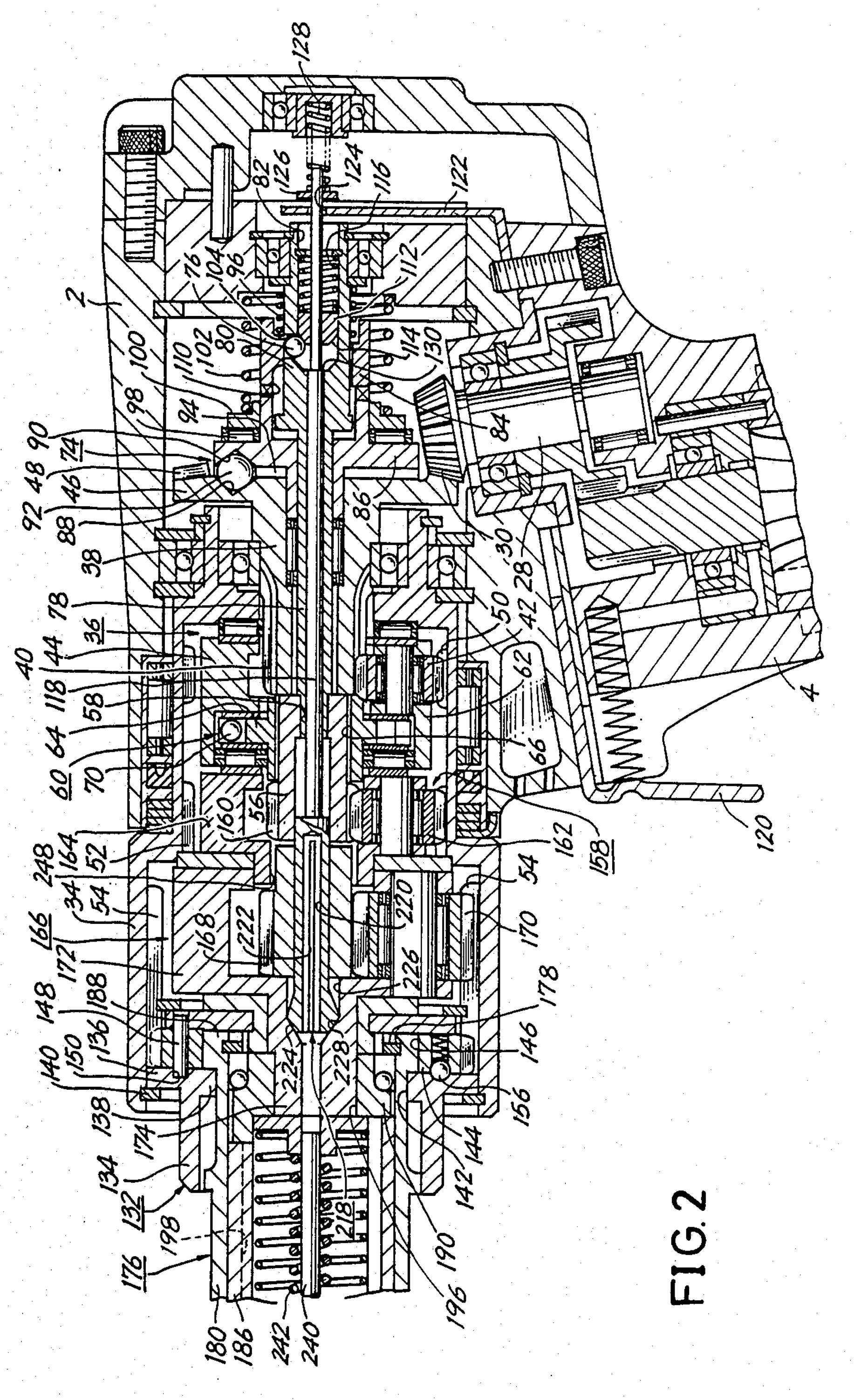
FIG. 2 is an enlarged fragmentary view in section of the tool shown in FIG. 1.

As seen in FIG. 2, a main shaft 38 is supported by the base end of the tubular case 34, the forward end of which is formed with the sun gear 40 of the main epicyclic train 36. The main shaft 38 has a flange 46 at its base end. A bevel gear 48 formed along the outer periphery of the flange 46 is in mesh with a bevel gear 30 on the transmission shaft 28.

One-way Clutch

The one-way clutch 60 for disconnectably coupling the support frame 44 to the output shaft 56 comprises a rotary member 64 disposed in an annular wall 62 extending from an end of the support frame 44 axially thereof as seen in FIGS. 2 and 5. The rotary member 64 is splined to the output shaft 56 as at 66 so as to be slidable on and rotatable with the shaft 56.

The rotary member 64 is equidistantly cut out as at 68 tangentially of its outer periphery. A ball 70 and a spring 72 for biasing the ball 70 toward the annular wall 62 are disposed in each cutout 68. The annular wall 62 is rotated at a reduced speed in the direction of arrow R1 by the epicyclic train 36. The output shaft 56 is fitted to a clutch shaft 78 having the polygonal shaft portion to be described later and is driven in the direction of arrow R2. While the speed change assembly is subjected to no load, R2>R1, permitting the shaft 78 to advance in rotation relative to the annular wall 62 which idly rotates free of the output shaft 56. The output shaft 56 rotates with the shaft 78 at a speed R2.

When the shaft 78 becomes free to rotate, i.e. R2=0, with a load acting on the speed change assembly, the annular wall 62 comes into engagement with the rotary member 64 to rotate therewith, consequently driving the output shaft 56 at the reduced speed R1.

Clutch Means

With reference to FIGS. 2, 3A and 3B, the clutch shaft 78 extends through the axis of the main shaft 38 and is freely rotatably independently of the main shaft. The shaft 78 has at each end thereof a polygonal shaft portion extending outward from the main shaft 38. The forward end of the shaft 78 is engaged in a hexagonal bore 78 formed in the rear end of the output shaft 56 coaxially therewith. The hexagonal shaft portion 80 at the rear end of the shaft 78 has an increased diameter and is formed with a bore 82 extending forward from its rear end face.

A slide tube 84 is fitted around the hexagonal shaft portion 80 of the clutch shaft 78 and is slidable thereon. A clutch plate 86 interposed between the slide tube 84 and the flange 46 of the main shaft 38 is freely rotatable on the clutch shaft 78 independently of the shaft 78. Conical cavities 88 and 90 are formed in the opposed faces of the flange 46 and the clutch plate 86, respectively, and are arranged equidistantly on the same phantom circle in opposed relation. A ball 92 is fitted in each pair of opposed cavities 88 and 90. These balls 92 are rollably supported by a ball cage 94 fitted around a tubular portion of the clutch plate 86.

The clutch plate 86 is biased toward the main shaft 38 by a spring 102 through a thrust bearing 98 and a holding plate 100.

As seen in FIG. 3B, the clutch plate 86 and the slide tube 84 have toothed edges 108 and 106 opposed to each other. The slide tube 84 is biased toward the clutch plate 86 by a spring 96, whereby the two toothed edges 106 and 108 are engaged with each other as shown in FIG. 2.

Holes 104 are formed in the wall of the hexagonal shaft portion 80 of the clutch shaft 78. A ball 76 having a diameter larger than the thickness of the wall is rotatably fitted in each hole 104. An escape recess 110 for the ball 76 to partly fit in is formed inside the slide tube 84 and extends approximately from its center portion toward the clutch plate 86.

A slide block 112 slidably fitted in the bore 82 in the hexagonal shaft portion 80 of the clutch shaft 78 is biased toward the main shaft 38 by a spring 116. The balls 76 bear on a tapered face 114 formed at the front end of the block 112.

A rotation change shaft 118 rotatably and slidably extends through the clutch shaft 78 and the slide block 112 coaxially therewith.

The front end of the shaft 118 has an increased diameter and provides a clamp portion 218 for the ejector pin 240 to be described later. The rear end of the shaft 118 has a reduced diameter and is connected to a trigger change lever 120 and biased forward by a spring 128.

The change lever 120 is formed from a metal strip by bending. The lever is bent in an arcuate form within the grip portion 4 to clear the transmission shaft 28 and further bent upward to provide a base end. The change shaft 118 extends through a hole 124 formed in the upper end of the bent portion 122.

The change shaft 118 is provided with a snap ring 26, which engages with the lever 120 when the lever 120 is pulled. When the lever 120 is pulled, a stepped portion 130 of the change shaft 118 toward its rear end moves the slide block 112 rearward against the spring 116.

Epicyclic Trains for Speed Reduction

The front portion of the output shaft 56 serves as the sun gear 160 of the first auxiliary epicyclic train 158. The sun gear 168 of the second auxiliary epicyclic train 166 is disposed to the front of the sun gear 160 in alignment therewith.

A support frame 164 supporting the planet gears 162 of the first auxiliary epicyclic train 158 is splined as at 248 to the sun gear 168 of the second auxiliary train 166. A support frame 172 for the planet gears of the second auxiliary train 166 is provided with a polygonal engaging shaft 174 in alignment with the sun gear 168.

The rotation of the output shaft 56 is subjected to speed reduction by the first and second epicyclic trains 158 and 166. A socket holder 132 is attached to the forward end opening of the tubular case 34.

Socket Holder

As seen in FIG. 2, the socket holder 132 comprises a main body 134 formed with outer and inner flanges 136 and 138 at its rear end. The rear end of the holder main body 134 is rotatably fitted in the tubular case 34. A gear 144 is slidable on the base end face of the main body 134. The main body 134 is prevented from slipping off the tubular case 34 by a snap ring 140.

Figure 6A:
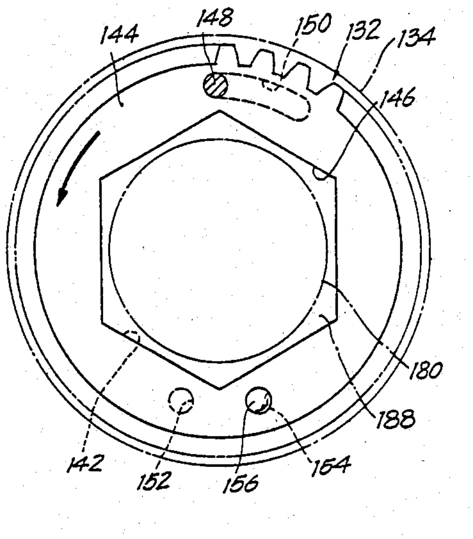
FIGS. 6A and 6B are views showing how a socket unit is installed in place.

The inner periphery of the inner flange 138 of the holder main body 134 defines a hexagonal hole 142 as shown in FIG. 6A.

The gear 144 is in mesh with an extension of the inner gear 54 meshing with the planet gears 170 of the second auxiliary epicyclic train 166.

The gear 144 is coaxially formed with a hexagonal hole 146 which is adapted to be in register with the hexagonal hole 142 of the socket holder 132.

A stopper pin 148 projecting from the gear 144 is slidably fitted in a circular arc groove 150 formed in the holder main body 134. The groove 150 is formed on a circle centered about the axis of the holder 132 and has a length equal to 1/12 of the circumference of the circle. Two conical cavities 152 and 154 are formed in the rear end of the holder main body in diametrically opposed relation to opposite ends of the circular groove 150. The gear 144 has a spring-biased click ball 156 which is engageable with the cavities.

The socket unit 176 is removably attached to the socket holder 132.

Socket Unit

The socket unit 176 comprises the outer socket 180, inner socket 200 and ejector pin 240. The unit is connectable to and removable from the holder 132.

As seen in FIG. 1, the outer socket 180 has a bore 182 coaxially extending therethrough and a nut engaging bore 184 at its front end and is freely rotatably provided in its interior with an inner socket holder 186 and a transmission tube 190, which is disposed at the base end of the holder 186 and prevented from slipping off by a snap ring 178.

The outer socket 180 is formed at its base end with a hexagonal flange 188 which is removably fitted in the hexagonal holes 142 and 146 of the holder main body 134 and the gear 144.

The inner socket holder 186 and the transmission tube 190 have toothed edges 192 and 194 opposed to and engaged with each other.

The tube 190 is coaxially formed with a polygonal bore 196 having removably engaged therein the engaging shaft 174 of the support frame 172 of the second auxiliary epicyclic train 166. The inner socket holder 186 is internally formed with axial spline grooves 198. The inner socket 200 is slidably in engagement with the grooves 198.

The inner socket 200 is formed in its front end with a tip engaging bore 202 for the bolt tip T to engage in and is biased forward by a spring 206.

The engaging bore 202 is provided with a plate spring 204 for preventing the bolt tip T from spontaneously falling off after the tip has been snapped off. The force of the spring is such that the spring 204 can retain the bolt tip against gravity while permitting the discharge of the tip without trouble.

The inner socket 200 is provided with known incomplete fitting prevention means.

To provide the preventing means, a hole 208 is formed in the wall of the inner socket 200. A ball 216 rollably fitted in the hole 208 has such a size as to project outward from the tubular wall of the socket 200. A tip insertion recognizing tube 210 is slidably fitted in the inner socket 200.

The insertion recognizing tube 210 has a small-diameter front portion and a large-diameter rear portion, with a tapered stepped portion 212 formed therebetween, and is biased toward the front end of the outer socket 180 by a spring 214. The ball 216 is pushed up outward by the large-diameter portion of the tube 210 into contact with the front end of the inner socket holder 186, whereby the inner socket 200 is prevented from retraction.

The ejector pin 240 of the socket unit 176 slidably extends through the tip insertion recognizing tube 210.

The ejector pin 240 is biased by a spring 242 toward the front end of the outer socket 180 and has a front end projecting beyond the tube 210 and a base end extending to a position close to the engaging shaft 174 of the planet gear support frame 172 of the second auxiliary epicyclic train 166.

Figure 6B:
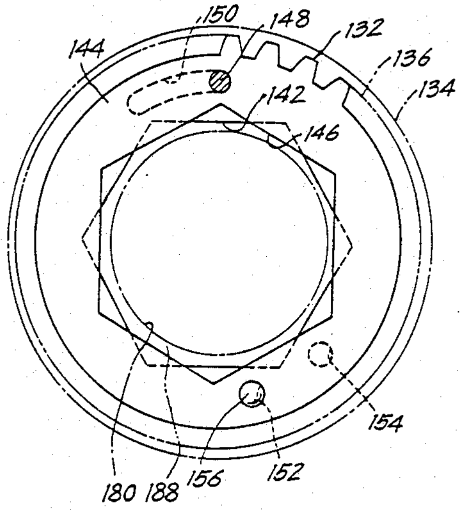
Figure 7:
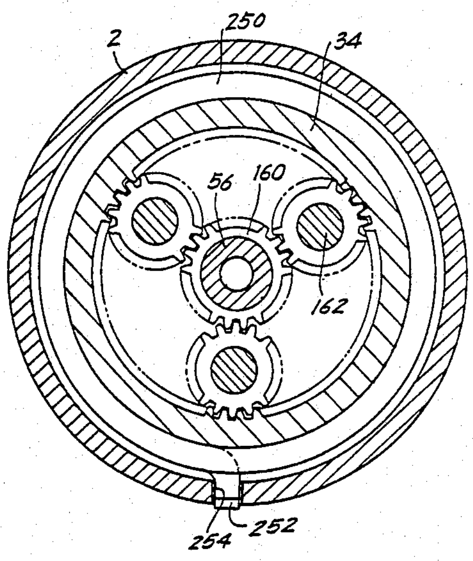
FIG. 7 is a view in section taken along the line VII—VII in FIG. 1.
Figure 8:
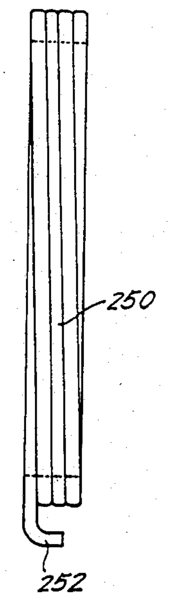
FIG. 8 is a side elevation showing a spring for preventing reverse rotation.

To attach the socket unit 176 to the holder 132, the hexagonal holes 142 and 146 of the socket holder main body 134 and the gear 144 are registered with each other as seen in FIG. 6A, the hexagonal flange 188 of the outer socket 180 is fitted into the holes 142, 146, and the holder main body 134 is rotated in the direction of arrow shown, whereby the hexagonal flange 188 of the outer socket 180 is brought out of register with the hexagonal hole 142 in the holder main body 134 as seen in FIG. 6B. This prevents the outer socket 180, accordingly the socket unit 176, from slipping off. Since the spring-biased click ball 156 engages in the conical cavity 152 of the socket holder 132 to moderately engage the holder 132, the hexagonal flange 188 of the outer socket 180 will not spontaneously come into register with the hexagonal hole 142 of the main body 134 during tightening, whereby the unit 176 is prevented from slipping off inadvertently.

The clamp portion 218 formed at the front end of the rotation change shaft 118 is adapted to releasably support the ejector pin 240.

Clamp Portion

The front end of the change shaft 118 is formed with a tapered face 224 and fitted in a base-end large-diameter portion of a stepped axial bore 226 extending through the support frame 172 of the second auxiliary train 172.

The stepped portion of the axial bore 226 is defined by a tapered face 228 corresponding to the tapered face 224 of the change shaft 118.

The change shaft 118 is coaxially formed with an axial bore 220 which is opened at its front end and has a slit 222 in communication with the axial bore 220. The change shaft 118 is spring-biased toward the outer socket 180 into contact with the tapered face 228 of the axial bore 226 of the support frame 172, whereby the axial bore 220 is diametrically contracted.

When the change lever 120 is pulled to rearwardly move the rotation change shaft 118 against the spring 128 away from the tapered face 228 of the bore 226, the slit 222, as well as the axial bore 220, is enlarged to permit entry of the ejector pin 240.

The tightening device described above operates in the following manner.

Engagement of Nut with Bolt

A nut is first loosely screwed on a bolt manually. When the throttle lever 22 is slightly pulled with the device placed on the bolt, air admitted at a small rate through the air flow channel 14 in the throttle pin 16 moves the drive assembly, and the bolt tip T fits into the tip engaging bore 202 readily with the inner socket 200 properly oriented. At this time, the ejector pin 240 and the insertion recognizing tube 210 within the socket 200 retract against the springs 214 and 242. When the bolt tip T has completely fitted into the bore 202, the ball 216 of the incomplete fitting prevention means falls from the tapered portion 212 of the tube 210 onto the small-diameter portion, permitting retraction of the inner socket 200 from the nut engaging bore 184 of the outer socket 180. The nut N therefore fits into the bore 184.

At this time, the ejector pin 240 rearwardly pushes the clamp portion 218 of the rotation change shaft 118, moving the tapered face 224 of the clamp portion 218 away from the tapered face 228 of the support frame 172. This enlarges the axial bore 220 of the clamp portion 218, allowing the rear end of the ejector pin 240 to advance into the enlarged axial bore 220, whereby the shaft 118 has its tapered face 224 brought into contact with the tapered face 228 of the support frame 172 again by the action of the spring 128. Consequently the axial bore 220 is diameterically contracted for the clamp portion 218 to clamp the ejector pin 240.

Tightening

When the rotor 8 is rotated by greatly pulling the throttle lever 22 to admit compressed air at a high rate, the main shaft 38 is rotated at a high speed through the transmission shaft 28.

The main shaft 38 is coupled to the clutch plate 86 by the balls 92 fitting in the conical cavities 88 and 90, and the clutch plate 86 rotates with the slide tube 84 by virtue of the engagement between the toothed edges 108 and 106. Further since the slide tube 84 has fitted therein the hexagonal shaft portion 80 of the clutch shaft 78, the rotation of the main shaft 38 is delivered to the clutch shaft 78.

Although the support frame 44 and the annular wall 62 of the main epicyclic train 36 coupled to the main shaft 38 rotate simultaneously with the above rotation at the reduced speed R1, R1<R2, so that the rotation of the annular wall 62 is made independent of the output shaft 56 by the one-way clutch 60. Thus, the rotation R2 of the main shaft 38 is delivered through the clutch shaft 78 directly to the output shaft 56 which is splined to the shaft 78 as at 66.

On the other hand, the sun gear 40 at the front end of the main shaft 38 causes the support frame 44 to rotate at the reduced speed R1.

The support frame 44 and the coupling shaft 56 are coupled together by the one-way clutch 60 which permits the rotation of the output shaft 56 in preference, and the rotation transmitted to the output shaft 56 is directly applied to the first auxiliary epicyclic train 158, giving an increased torque of reduced speed to the planet gear support frame 164 of the train 158.

The torque of the support frame 164 is fed to the second auxiliary epicyclic train 166 to which the frame 164 is splined as at 248, giving a further increased torque of lower speed to the support frame 172 of the train 166.

The rotation of the support frame 172 is delivered to the inner socket 200 via the transmission tube 190 and the inner socket holder 186 of the socket unit 176.

Further torque acting in an opposite direction to the rotation of the inner socket 200 develops in the inner gears 50, 52, 54 in mesh with the planet gears 42, 162, 170 of the trains 36, 158, 166. With the bolt tip T held by the inner socket 200, this causes the outer socket 180 to rotate the nut N at a relatively high speed to quicky tighten the nut on the bolt.

Tightening Up and Shearing

When the nut is tightly screwed on the bolt, abruptly increasing resistance acts on the rotary drive system, and the resistant force of the clutch shaft 78 exceeds the force of the spring 102, with the result that each ball 92 moves out of the conical cavities 88, 90 of the main shaft 38 and the clutch plate 86 as shown in FIG. 3A, compressing the springs 102 and 96 to push the clutch plate 86 and the slide tube 84 rearward. At this time, the escape recess 110 in the slide tube 84 is positioned as opposed to each ball 76 on the clutch shaft 78, such that the ball 76 is pushed out and fitted into the escape recess 110 by the slide block 112, permitting the slide block 112 to advance and the ball 76 to ride onto the slide block 112. The slide block 112 is advanced by the action of the spring 116, preventing the return of the balls 76 to the original position.

With the main shaft 38 in rotation at all times, the balls 92 between the main shaft 38 and the clutch plate 86 fit in the respective adjacent conical cavities **88*a*, 90*a* as seen in FIG. 3B, causing the clutch plate 86 to rotate with the main shaft 38. However, since the slide tube 84 is restrained from advancing and held in its retracted position by the balls 76, the clutch plate 86 is disengaged from the slide tube 84 and idly rotates without delivering the rotation of the main shaft 38 to the slide tube 84**.

On the other hand, the rotation of reduced speed R1 of the support frame 44 of the main epicyclic train 36 drives the rotary member 64 through the balls 70 in FIG. 5 to deliver the torque to the output shaft 56.

The rotation of the output shaft 56 is smaller in the number of revolutions but larger in torque by an amount corresponding to the speed reduction achieved by the main train 36, than the resistance-free rotation thereof in the initial stage of tightening described.

The increased tightening torque is delivered to the inner socket 200 and the outer socket 180. At the ultimate stage of bolt-nut tightening, the torque causes stress concentration on the grooved portion C of the bolt for snapping off the tip T, whereby the tip T is sheared. This assures that the nut is tightened up on the bolt with a specified torque value.

Discharge of Tip and Return of Parts

After tightening up, the cut-off bolt tip T remains in the inner socket 200 as retained by the plate spring 204. When the entire device is moved away from the nut N, the front end of the inner socket 200 is advanced into the nut fitting portion of the outer socket 180 and returned to its original position by the spring 206.

At this time, the ejector pin 240 remains in its retracted position as clamped by the clamp portion 218 of the rotation change shaft 118.

When the tapered face 224 of the shaft 118 is moved away from the tapered face 228 of the support frame 172 by pulling the change lever 120 and thereby retracting the shaft 118, the axial bore 220 of the shaft 118 enlarges to release the ejector pin 240 from the clamp portion, whereupon the ejector pin 240 is forced forward by the spring 242 to throw out the bolt tip T.

Further when the change lever 120 is pulled, the stepped portion 130 of the shaft 118 retracts the slide block 112 of the clutch 74, whereby the balls 76 retained by the slide block 112 are allowed to retract into the end bore of the shaft 118 to permit the advance of the slide tube 84.

When advanced by the spring 96, the slide tube 84 is brought into meshing engagement with the clutch plate 86 and brought to the original position, ready for the next tightening operation.

In embodying the present invention, the transmission tube 190 of the socket unit 176 can be connected to the output shaft 56 without using the auxiliary epicyclic trains 158 and 166, or an increased number of auxiliary epicyclic trains is usable to give a greatly increased torque.

Further it is possible to fix the tubular case 34 to the housing 2 and to connect a socket having a nut engaging portion directly to the output shaft 56 to use the device as a nut runner.

The present invention has the following great advantages.

When the load of tightening increases, the socket is automatically driven at a low speed with increased torque to assure tightening without objection. Stated more specifically, while the load on the output shaft is small, the clutch means acts to rotate a sun gear with the output shaft to effect low-torque high-speed rotation, whereas if the load on the output shaft increases, the clutch is disengaged to rotate the output shaft at a low speed with increased torque through an epicyclic train based on the differentiation principle.

Further once the socket has been switched for low-speed high-torque rotation, the clutch means will not return unless the handle is operated, such that the low-speed rotation can be maintained even if the load subsequently decreases. This eliminates the harzard that the socket will abruptly rotate at an increased speed during the operation of conventional devices.

The present invention is not limited to the foregoing embodiment but can of course be modified variously within the scope defined in the appended claims.

What is claimed is:

1. A rotary power tool wherein a tightening socket is rotated at a high speed with a low torque in the first stage of tightening and at a low speed with a high torque in the final stage of tightening and which comprises:

a one-way clutch included in a system for transmitting power from an epicyclic train to the tightening socket, the epicyclic train comprising a sun gear coupled to and drivingly rotatable by a drive assembly, a planet gear support frame coupled to the tightening socket and an inner gear, an output shaft disposed coaxially with the sun gear and coupled to the tightening socket, the planet gear support frame being disengageably engaged with the output shaft by the one-way clutch, and a clutch shaft rotatably extending through the center of the sun gear and having a front end engaged with the output shaft and a rear end disengageably engaged with the sun gear by clutch means;

the clutch means comprising a clutch plate engageable with the sun gear by being biased by a spring for rotating said tightening socket at a high speed with a low torque and disengageable from the sun gear when said tightening socket is subjected to a high load, a slide tube fitting around the clutch shaft so as to be slidable on and rotatable with the clutch shaft, the slide tube being engageable with the clutch plate by being biased toward the clutch plate by a spring, an arresting mechanism for holding the slide tube in a retracted position when the clutch plate and the slide tube are retracted against the springs by a high load acting on the clutch plate, and a change lever for manually releasing the slide tube from the arresting mechanism; and means for rotating said tightening socket at low speed with a high torque while said clutch plate and said sun gear are disengaged.

2. A rotary power tool as defined in claim 1 wherein the arresting mechanism comprises a slide block biased by a spring toward the clutch plate and slidably fitted in a bore formed in the clutch shaft toward the base end thereof, and engaging balls each fitting in a hole formed in the bore-defining peripheral wall of the clutch shaft, the slide tube being formed inside thereof with an escape recess for permitting projection of the engaging ball, the change lever being coupled to the slide block and retractable by pushing.

* * * * *